K. SAYO.
ROLL FILM TURNING DEVICE.
APPLICATION FILED JULY 1, 1920.

1,375,324.

Patented Apr. 19, 1921.

INVENTOR
K. SAYO
BY Wright & Chune
ATT'YS

UNITED STATES PATENT OFFICE.

KOTARO SAYO, OF SAN FRANCISCO, CALIFORNIA.

ROLL-FILM-TURNING DEVICE.

1,375,324.   Specification of Letters Patent.   Patented Apr. 19, 1921.

Application filed July 1, 1920. Serial No. 393,379.

*To all whom it may concern:*

Be it known that I, KOTARO SAYO, a subject of the Emperor of Japan, residing at San Francisco, in the county of San Francisco and State of California, have invented new and useful Improvements in Roll-Film-Turning Devices, of which the following is a specification.

This invention relates to improvements in cameras of the type using roll films.

The primary object of this invention is to provide novel, inexpensive, and effective means with which the roll of film may be unwound more quickly, easily, and accurately to present the several picture sections of the film in position for exposure.

In the ordinary camera, the operator is required to turn the thumb piece several times to present an unexposed picture section of the film in a position for exposure. Very often, the film is unwound too much and two film sections, instead of one, are in part brought into position for exposure with the result that both sections are spoiled.

With my invention, the unwinding of the film to present a picture section thereof in proper position for exposure is effected by giving a pull on a flexible element, there being means arranged in such manner that when the section is in proper position, it is frictionally held and further pulling of the flexible element can only be effected by overcoming the frictional resistance whereby the operator is warned that the film is in the proper position. This arrangement overcomes the objections hereinbefore noted in the ordinary camera.

The invention possesses other advantages and features, some of which with the foregoing will be set forth at length in the following description wherein I shall outline in full that form of the invention which I have selected for illustration in the accompanying drawings and forming a part of the present specification. In said drawings, I have shown one form of the construction of my invention, but it is to be understood that I do not limit myself to such form, since the invention as expressed in the claims may be embodied in a plurality of forms.

Figure 1:
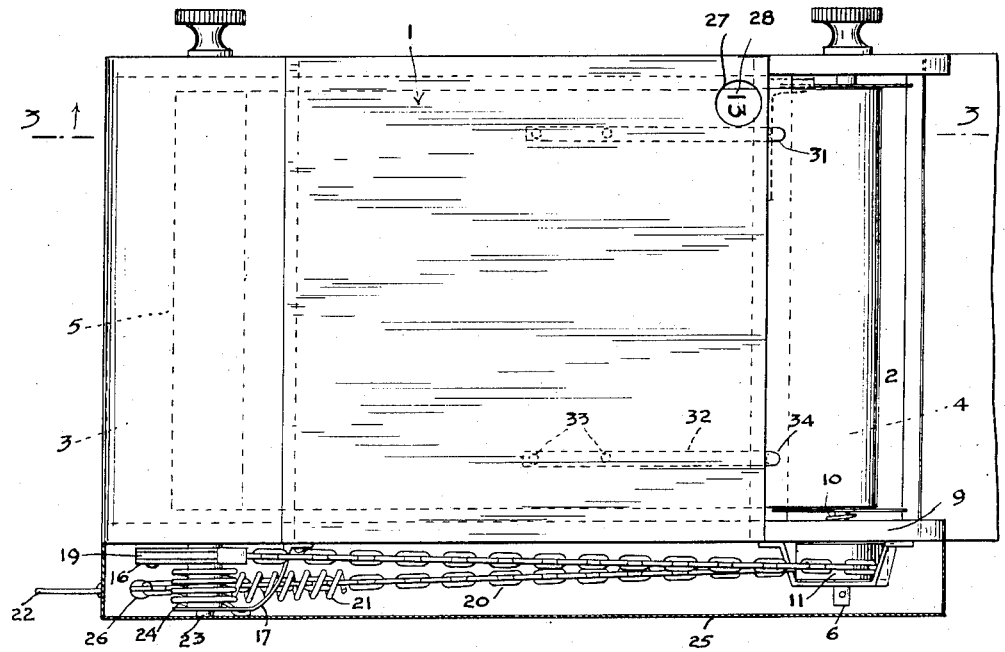
Figure 1 is a rear elevation of a camera showing my invention applied thereto, said camera being broken away in part.
Figure 2:
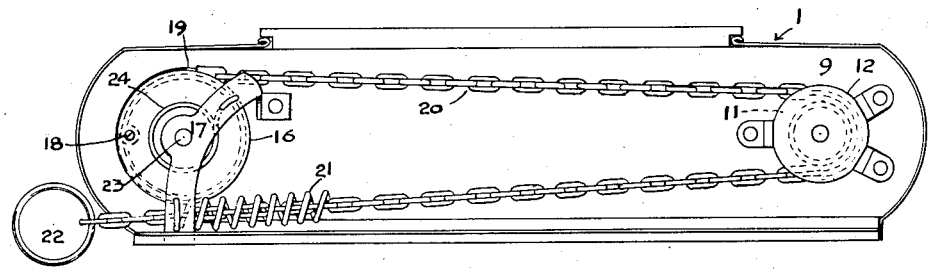
Fig. 2 is a side elevation of the mechanism of this invention.
Figure 3:
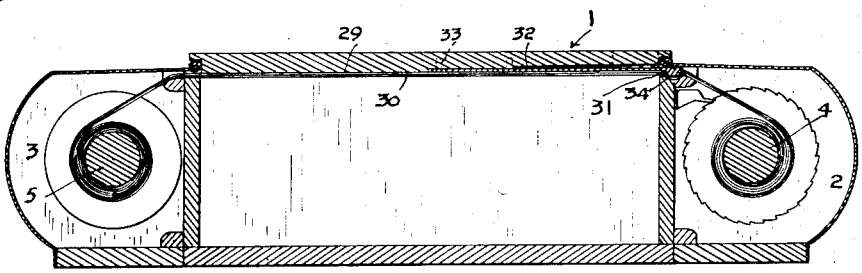
Fig. 3 is a longitudinal sectional view taken on the line 3—3 of Fig. 1.
Figure 4:
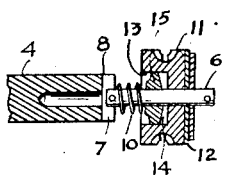
Fig. 4 is a fragmentary sectional view of a detail of the invention.

Referring to the present embodiment of the invention as illustrated in the drawings, 1 designates a camera case for the folding pocket type of camera. In the ends of the case are provided compartments 2 and 3 for the reception of a winding roll 4 and a film roll 5. These rolls are insertible in the camera as in the ordinary camera. The details of the construction of the camera have been omitted as it is thought unnecessary to illustrate such details in connection with the present invention.

The film from the film roll 5 is connected in the ordinary manner with the winding roll 4. In one end of the compartment 2 for the winding roll there is provided a winding stem 6 having a head 7 adapted to be inserted into the transverse notch 8 in the end of the roll 4. This stem is rotatably mounted in the side wall 9 of the camera case and is longitudinally adjustably disposed in said side wall, being normally extended by a helical expansion spring 10.

The stem 6 is extended through the center of a sprocket wheel 11, which wheel is rotatably mounted in a suitable bearing 12 therefor fixed upon the outer face of the wall 9. The sprocket wheel is provided with an inwardly opening recess 13, one face of which is provided with ratchet teeth 14. Fixed upon the stem 6 is a ratchet 15 which coöperates with the ratchet teeth 14. Ratchet teeth and the ratchet wheel 15 are so arranged that when the sprocket 11 is turned in a clock-wise direction the stem is likewise turned but when the sprocket is turned in a counter-clock-wise direction, the ratchet teeth 14 slip past the ratchet teeth on the wheel 15 and do not transmit rotation to the stem 6. This arrangement prevents the turning back of the film after it has been wound.

Mounted upon the outer face of the side wall 9 at the end thereof opposite the end on which the sprocket 11 is carried is a flanged wheel 16 journaled in suitable bearings 17. Fixed by a removable pin or screw 18 to the wheel 16 is an elastic band 19 which is wrapped around the wheel and extended in the direction of the sprocket 11.

Connected with the free end of the band 19 is a sprocket chain 20 which extends over the top of the wheel 16 toward and is rove around the sprocket wheel 11 being extended from the under side of the sprocket wheel back toward and beneath the wheel 16. The sprocket chain 20 is extended through a helical spring guide member 21 fixed to the bracket or bearing 17 and upon the free end of said chain a ring 22 is fixed. The shaft or axle 23 for the wheel 16 has a helical spring 24 mounted thereon and said spring is fixed to the bearing 16 and to the wheel so as to return the wheel to normal position after a pull has been given to the chain 20 and the wheel 16 is rotated so as to unwind the elastic band therefrom. This mechanism mounted on the outside of the wall 9 is preferably inclosed by a flanged elongated cover 25, which cover is fixed in any suitable manner to the wall 9 and in one end thereof has an opening 26 through which the chain 20 extends. The camera case 1 is provided with an opening 27 therein through which opening the numbers 28 on the roll of film may be viewed so as to determine when a picture section of the film is brought into position for exposure. This arrangement is the same as provided in the ordinary camera and need not be described in detail.

To prevent the picture sections of the roll of film from being moved past proper position for exposure, the protecting strip of paper 29 for the film 30 and also the film are provided with registering perforations 31, which perforations are formed along the margins of the picture sections between picture sections. Mounted upon the inside of the case 1 are spring arms 32 which are fixed at certain ends, as at 33, to said case and at their other ends are provided with projections 34. These projections are adapted to engage in the openings 31 when the picture sections are in proper positions for exposure and by such an engagement serve to frictionally hold the film against being moved.

In the operation of the device of this invention, when it is desired to unwind a film roll so as to present a picture section of the film in position for exposure, the ring 22 on the free end of the chain 20 is grasped and the chain pulled to its full extent outwardly. This causes the sprocket wheel 11 to be rotated in a clock-wise direction, and by reason of the ratchet arrangement between the stem 6 and sprocket wheel, the winding roll 4 is rotated in a clockwise direction and the film wound thereon. The elastic band 19 offers a yielding action during the pulling of the chain so that when the openings 31 in the film roll receive the projections 34 on the spring arms and the film is frictionally held against further movement, a continued pull on the chain will be met with resistance, but due to the yielding of the flexible band, will not cause said projections to be moved out of the openings 31.

In order to disengage the projections from the openings 31, the mechanism is allowed to assume a normal position and by giving a steady pull on the chain the frictional engagement of the members 34 is overcome and the film is allowed to unwind in the ordinary manner. The length of the chain is such and the mechanism is so constructed that when the first film section is brought into position for exposure one pull only is required to move said section into position. As a warning to the operator that the picture section is in proper position, when the projections 34 on the spring arms engage with the openings 31 in the film, further movement of the chain is met with resistance and as an additional check, the operator may determine, by looking through the opening 27, when the number 28 on the film is in line with said opening.

I claim:—

1. A camera having a film winding roll, a wheel operatively associated with said winding roll, and a flexible element rove around said wheel and which when pulled rotates the roll so as to wind the film thereon, said flexible element having one end free from connection with and disposed in the position to be grasped exteriorly of the camera.

2. A camera having a film winding roll, a wheel operatively connected with said roll, a flexible element rove around said wheel and which when pulled rotates the wheel and roll, and means for engaging and frictionally resisting the movement of the film when a picture section of the film is brought into a position for exposure.

3. A camera having a film winding roll, a wheel operatively associated with said film winding roll, another wheel mounted in the camera at a point spaced from the first wheel, and an elastic member fixed to and wound around said last-named wheel, a flexible member secured to the free end of the elastic member extending around said first-named wheel and having one end disposed outside of the camera.

4. A camera having a film winding roll, a wheel operatively associated with said film winding roll, another wheel mounted in the camera at a point spaced from the first wheel, and an elastic member fixed to and wound around said last-named wheel, a flexible member secured to the free end of the elastic member extending around said first-named wheel and having one end disposed outside of the camera, and means for frictionally engaging and resisting movement of the film when a picture section of the film is brought into position for exposure.

KOTARO SAYO.